United States Patent [11] 3,586,749

| [72] | Inventors | Sergei Apollonovich Iodkovsky<br>N. Kuzminki ulitsa Zelinodolskaya, 17, korpus 3, kv. 59., Moscow;<br>Arseny Nikolaevich Gorozhankin, ulitsa Sharikopodshipnikovskaya 2, kv. 179, Moscow; Anatoly Petrovich Fomichev, ulitsa Textilschiki 4, dom 3, kv. 62, Moscow; Jury Mikhailovich Mironov, prospekt Lenina, 11a, Kv. 17., Cheboxary; Valery Konstantinovich Proskurovshy, ulitsa Usacheva 29, korpus 2, kv. 130, Moscow, all of, U.S.S.R. |
|---|---|---|
| [21] | Appl. No. | 835,169 |
| [22] | Filed | June 20, 1969 |
| [45] | Patented | June 22, 1971 |

[54] METHOD FOR THE ELECTROSLAG WELDING AND BUILDING UP OF METALS AND ALLOYS
5 Claims, 1 Drawing Fig.

| [52] | U.S. Cl. | 13/9, 219/73 |
|---|---|---|
| [51] | Int. Cl. | B23k 25/00, H05b 3/60 |

| [50] | Field of Search | 13/9; 219/73 |
|---|---|---|

[56] References Cited
UNITED STATES PATENTS

| 2,448,886 | 9/1948 | Hopkins | 13/9 |
| 3,167,420 | 1/1965 | Robiette | 13/9 X |

*Primary Examiner*—Bernard A. Gilheany
*Assistant Examiner*—Roy N. Envall, Jr.
*Attorney*—Waters, Roditi, Schwartz & Nissen ABSTRACT: A method is provided for the electroslag welding and building up of metals and alloys which comprises immersing a consumable electrode into a slag bath and passing electrical current to the electrode to produce melting thereof and consequent welding or building up of metal from the electrode, the electrode being surrounded by a shield which is immersed into the slag bath such that its lower end is disposed at least at the level of the tip of the electrode being melted. The shield is isolated from the source of supply of electrical current and serves to concentrate the evolving heat into the slag bath in the interelectrode gap while reducing outward thermal flow.

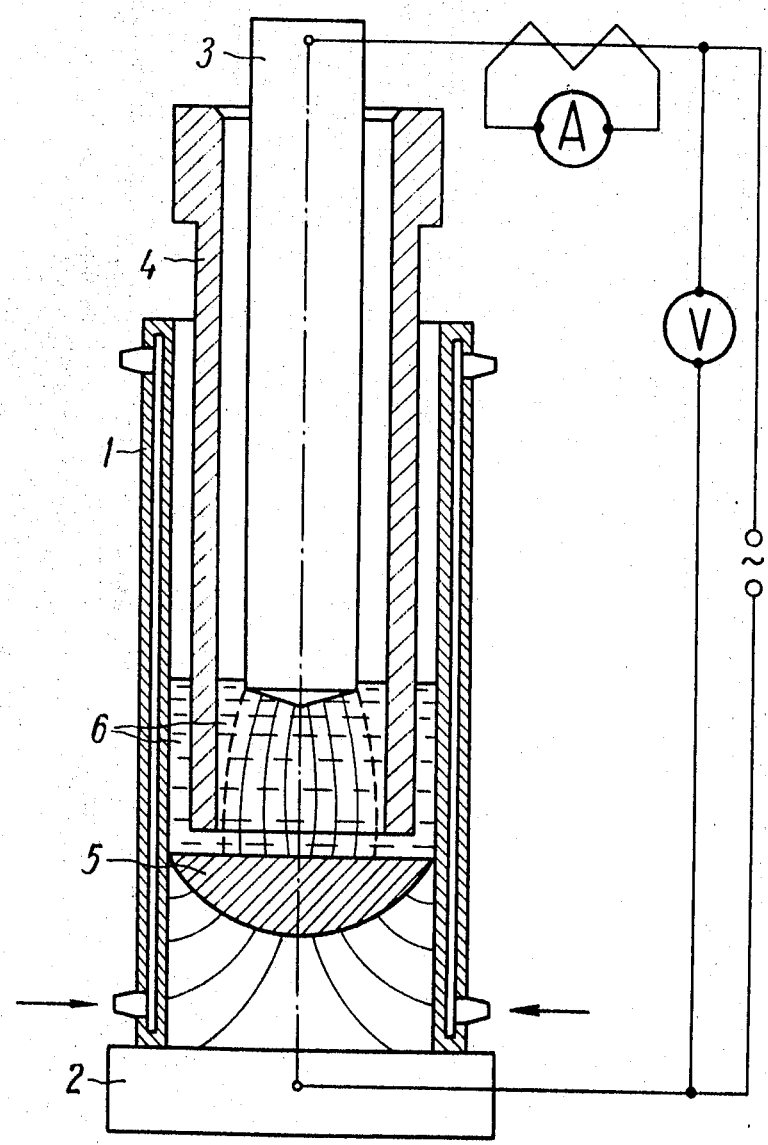

METHOD FOR THE ELECTROSLAG WELDING AND BUILDING UP OF METALS AND ALLOYS

The present invention relates to methods of electroslag welding and building up of metals and alloys, and may be employed with any electroslag processes in metallurgical, machine building and other industries.

Known in the prior art is a method of the electroslag welding and building up of metals and alloys, carried out by using to advantage heat evolving in liquid slag when current passes therethrough.

An increase in the amount of heat evolving in the slag bath speeds up the melting of an electrode immersed in the liquid slag, and hence, increases the productivity of the electroslag process.

The amount of heat thus evolving is directly proportional to the square of current intensity, which is determined by the value of interelectrode gap (the distance between the end of the electrode to be melted down and the surface of molten metal bath) increasing as the current intensity decreases.

The interelectrode gap may vary within a specified narrow range, beyond which the electroslag process passes over into an electric arc one.

Owing to this fact, it is impossible to increase productivity of the electroslag welding and building up process through an increase in the current intensity and corresponding increase in the amount of heat evolving in the slag bath.

On the other hand, productivity of the electroslag process also depends on the amount of heat which is lost through the walls of a water-cooled mold.

According to the existing methods of the electroslag welding and building up processes, these losses are determined by the heat conductivity of the mold material, and at present they cannot be reduced.

Hence, productivity of the electroslag process may be increased either by increasing the total amount of heat evolving in the liquid slag or by reducing the heat losses through the mold walls.

A principal object of the present invention is to provide a method for the electroslag welding and building up of metals and alloys permitting redistributing heat evolving in liquid slag in the direction of its preferable evolution at the consumable electrode and reduction of heat losses from the lateral surface of the liquid slag bath through the walls of the water-cooled mold.

This object is achieved by a method for the electroslag welding and building up of metals and alloys, in which, according to the invention, a consumable electrode immersed into the liquid slag bath is placed inside a shield which is not connected to a power source, the said shield being disposed in such a manner that its lower end is disposed at some distance from the surface of molten metal. It is expedient to shape the shield as a hollow cylinder.

It is also expedient to make the shield of a material which is not soluble or only slightly soluble in liquid slag.

The present invention will further be made more fully apparent from a consideration of the following description of an exemplary embodiment thereof, taken in conjunction with the accompanying drawing the sole figure of which is a section view of the device for carrying into effect the method for the electroslag building up of metals.

It is known that the electroslag process envisages remelting a metal (consumable) electrode under a layer of slag in a water-cooled mold.

The mold 1 is placed on a current-conducting, water-cooled bottom plate 2. In the building up process, electric current is supplied to a consumable electrode 3 and the bottom plate 2. To protect the bottom plate 2 against burning by the possible striking of electric arc between the electrode 3 and the bottom plate 2, prior to deposition, a metal current-conducting washer or starting piece is placed on the bottom plate (not shown in the drawing).

The electroslag deposition according to the proposed method can be effected in any electroslag remelting furnace in the following manner.

Prior to introducing a consumable electrode 3 into the mold 1 on the bottom plate 2, a shield 4 is lowered into the mold, said shield 4 being made of a material which is not soluble or only slightly soluble in liquid slag. The shield is preferably shaped as a hollow cylinder. Yet, when the building up operation is carried out in a mold of a noncylindrical shape, the form of the shield should be adopted to correspond to that of the mold.

The upper portion of the shield 4 is secured in a holder (not shown in the drawing) adapted to move the shield both vertically and horizontally.

Then, a consumable electrode 3 is lowered into the mold in a manner usual for the electroslag remelting furnace so that it is surrounded by the shield that has been earlier introduced.

The shield and the consumable electrode are lowered into the mold approximately to the middle of its height, and they are centered by horizontally moving the shield 4 and the mold 7 with regard to the consumable electrode 3.

The mold 1, shield 4 and consumable electrode 3 should be coaxial, as it provides for the most uniform heat withdrawal from deposited metal 5 and for obtaining the most regular structure thereof.

The distance between the mold wall and the external wall of the shield, as well as between the internal wall of the shield and the lateral surface of the consumable electrode, should be such that liquid slag 6, present in a small quantity between the said surfaces, does not have enough time for solidifying and would not prevent the shield and the consumable electrode from moving in the mold.

Slag 6 is rendered molten in the mold with the aid of the consumable electrode 3 as is conventional for the electroslag deposition.

In view of the fact that in the electroslag building up process, oxide or fluoride slags are, as a rule, employed, the shield is made of materials that are not soluble or only slightly soluble in the said slags, for example, graphite or high-melting metals.

On melting down slag and stabilizing the building up process, the shield immersed into the slag bath (liquid slag 6) is heated prior to being immersed in the liquid slag, the shield being kept for some period of time above the surface of the liquid slag. The depth of immersing the shield into the liquid slag should be near that of the consumable electrode into the slag.

The depth of immersing the shield into the liquid slag is controlled according to the current intensity or voltage in the circuit shield-deposited metal. The current intensity and voltage should be kept at a constant value during the entire building-up period.

The immersing of the shield into the liquid slag causes a variation in heat and electric currents in the latter, which results in concentration of the evolving heat in the central part of the slag bath, i.e. in the region disposed between the consumable electrode and the shield; in reduction of the thermal current or flow directed into the walls of water-cooled mold, and in a more uniform distribution of heat all over the surface of metal bath (deposited metal) 5.

This, in turn, brings about a considerable increase in the speed of fusion of the consumable electrode, a reduction in heat losses through the walls of the mold, and a more even surface of the molten bath.

The immersing of the shield into the liquid slag eventually causes an increase in the thermal coefficient of the electroslag remelting furnace efficiency, an increase in its productive capacity with a somewhat improved structure of the metal to be deposited (owing to a more even surface of the molten metal bath).

In the electroslag building-up process, the rate of fusion of the consumable electrode corresponds to the speed of its immersing into the liquid slag, which allows the required interelectrode gap to be maintained.

Introduction of the shield into the liquid slag does not vary the electrical characteristics of the building-up process (current intensity and voltage) and, hence, does not vary the interelectrode gap.

However, the rate of fusion of the consumable electrode increases. Therefore, to maintain the interelectrode gap at a constant value after immersing the shield into the liquid slag, the speed of immersing the consumable electrode will have to be increased to a value which will permit maintaining the electrical characteristics (current intensity and voltage) that are found when operating without the use of the shield.

The electroslag welding when carried into effect in a similar manner, features a considerable increase in the productive capacity with the quality of welded articles being maintained at a constant level.

From what has been stated above, it is possible to conclude that the proposed method of the electroslag welding and building up of metal and alloys allows the productive capacity of the process to be considerably increased by as much as two to five times without impairing the quality level of the building-up and welding operations.

Though the present invention is described in connection with its preferred embodiment, it is obvious that there may be allowed modifications and variants thereof that do not depart from the idea and scope of the invention, which will be readily understood by those skilled in the art.

These modifications and variants are understood to fall within the idea concept and scope of the invention, as defined by the appended claims.

We claim:

1. A method for the electroslag welding and building up of metals and alloys, said method comprising forming a slag bath, immersing a consumable electrode into the slag bath, passing electrical current to said electrode to produce melting thereof, surrounding the electrode by a shield which is immersed into the slag bath to a depth such that its lower end is disposed at least at the level of the tip of the electrode being melted and isolating the shield from the source of supply of electrical current.

2. A method as claimed in claim 1, comprising introducing the shield into the slag bath prior to the immersion of the consumable electrode.

3. A method as claimed in claim 1 comprising adjusting the lateral position of the shield to provide a substantially coaxial relation between the electrode and shield.

4. A method as claimed in claim 1 comprising heating the shield prior to immersion thereof in the bath.

5. A method as claimed in claim 1, wherein said shield is immersed beyond the tip of the electrode to concentrate the evolving heat into the slag bath in the region between the electrode and the accumulating metal thereof while reducing outward thermal flow.